Sept. 6, 1966  J. KOHL ETAL  3,271,039
PACKING RING AND METHOD OF MAKING
Filed March 29, 1962  2 Sheets-Sheet 1

INVENTORS
JOHN KOHL
& GENE PILLAR
BY
Barnes, Kisselle, Raisch & Choate
ATTORNEYS Sept. 6, 1966    J. KOHL ETAL    3,271,039
PACKING RING AND METHOD OF MAKING
Filed March 29, 1962    2 Sheets-Sheet 2
FIG. 4
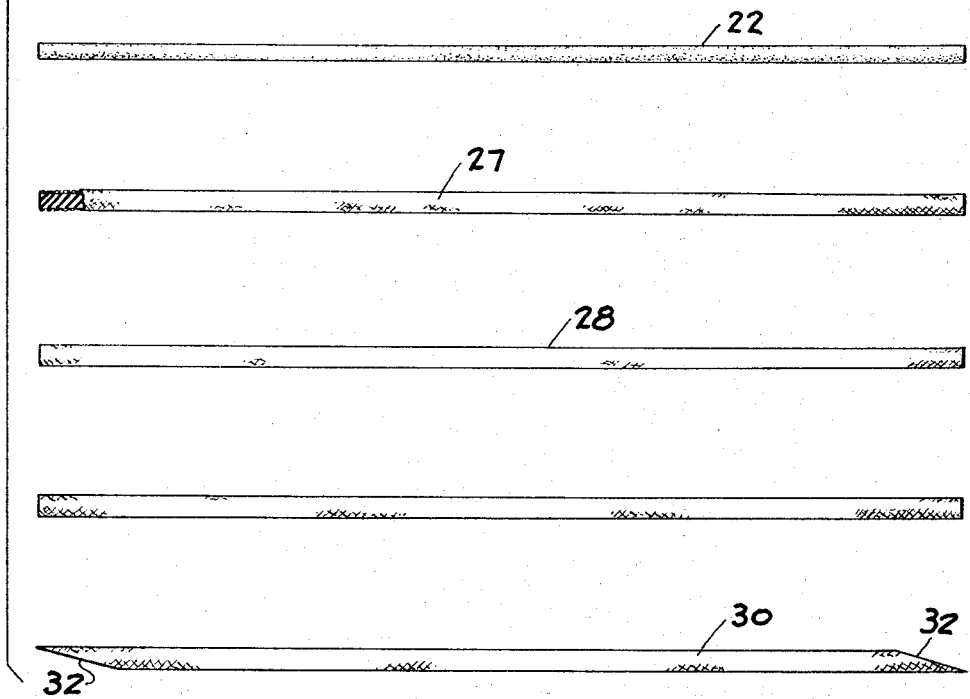
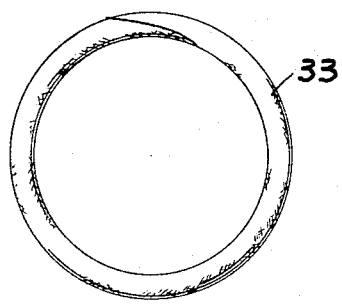
FIG. 5
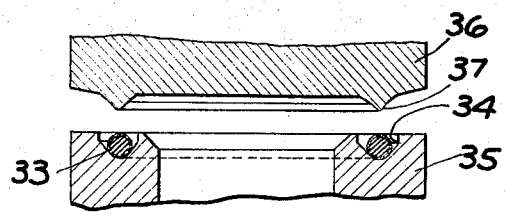
FIG. 6
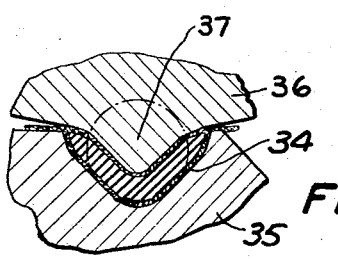
FIG. 7
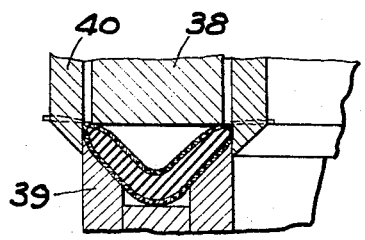
FIG. 8
INVENTORS
JOHN KOHL
& GENE PILLAR
BY
Barnes, Kisselle, Raisch & Choate
ATTORNEYS United States Patent Office 3,271,039
Patented Sept. 6, 1966

3,271,039
PACKING RING AND METHOD OF MAKING
John Kohl, Birmingham, Mich. (111 E. 10 Mile Drive, Hazel Park, Mich.), and Gene Pillar, Livonia, Mich.; said Pillar assignor to said Kohl
Filed Mar. 29, 1962, Ser. No. 183,467
5 Claims. (Cl. 277—228)

This invention relates to packings of the type which are used in hydraulic applications and to the method of making such packings.

One type of hydraulic packing commonly used is made by coating webs of fabric with elastomeric compounds by passing the fabric through the heavy rolls of a suitable calender. The calendered fabric is wound into a roll and often a layer of a separating film is provided between the layers of the roll to prevent the calendered fabric from sticking together. The calendered fabric is used to make molded packings by unrolling the fabric and cutting it. According to one method, a sheet of the material is die-cut in a press in the form of circular bands and the bands are piled up to the required thickness in laminar form. The laminated layers are placed in the cavity of a mold and pressure and heat are applied to cure the packing. Alternatively, the sheet of calendered fabric is passed through a slitting machine and the strips are wound in the form of a narrow roll with the layers extending generally axially of the roll until the number of layers in the roll are sufficient to constitute the desired size of packing. The thus formed layers are placed in the mold and compression and heat is applied to cure the roll. According to another method, a wide strip of the calendar fabric is cut and rolled on an axis running the length of the strip after which it is bent in circular form to the approximate packing diameter, the ends are joined and the unformed packing is then placed in a mold and compressed and heated to form the finished packing.

One of the problems in making molded packing in the manner above described is that the calendar rolls must be properly adjusted with care and, for this reason, short runs are not practical. In addition, some elastomeric compounds have rheological properties in the uncured state such that they are very difficult or impossible to handle on a calendar. In addition, the slitting or cutting of a calendered sheet, combined with the stacking and rolling of the cut pieces, necessitates substantial handling and labor. The cutting results in an increased cost of materials since there is considerable waste. Of course, the use of a calendar involves a substantial expense for such heavy equipment.

The product obtained by the aforementioned conventional methods has a major disadvantage in that there is a lack of symmetry and uniformity of the fabric distribution in the packing. Because cut pieces are laid up in the ring that is molded, there is a tendency for the pieces to slip relative to one another and a possibility for the elastomeric material to collect at one point resulting in a weakened area of the packing.

It is an object of this invention to provide a packing and a method of making the packing that will obviate the aforementioned disadvantages in present packings and method of making such packings.

It is a further object of the invention to provide a packing which has symmetry and uniformity of fabric distribution; wherein the characteristics may be closely attained by minor adjustments in the manufacturing process; wherein weak spots are substantially eliminated; wherein there is increased resistance to rupture; wherein the elastomeric material has less tendency to swell under the influence of hydraulic fluids than in packings previously used; and which has a neater appearance and improved sealing characteristics.

It is a further object of the invention to provide a method of making molded packing which obviates the need for calendering a sheet of fabric; wherein a greater variety of combinations of elastomeric compound and fabric can be used; wherein there is substantially no waste; wherein elastomeric compounds can be used that cannot be used by the calendering method; and wherein the problem of inventory is substantially reduced because short runs can be easily made.

Basically, the packing of the present invention comprises a ring having a core of cured elastomeric material and one or more layers of fabric braided over the core, the interstices between the filaments of the fabric and the layers of the fabric being filled with cured elastomeric material. The packing is made by extruding a continuous length of uncured elastomeric material, passing the extruded length through a braiding machine which braids a seamless layer of fabric over the core, dipping the braided core in a solution comprising uncured elastomeric composition and solvent, drying the solvent. Where desired, additional layers of fabric may be applied with additional dipping for each layer prior to drying. When it is desired to make a packing ring, a length of the dried, dipped and braided core is cut and formed into a ring by bringing the ends together, the thus preformed ring is placed into a mold and pressure and heat are applied to shape and cure the ring to the desired cross section. The ring can then be trimmed, if needed, to make the final packing.

In the drawings:

FIG. 4 is a view showing the condition of successive portions of the core during the manufacture.

FIG. 5 is a plan view of the preformed ring prior to shaping.

FIG. 6 is a sectional view through the pressing and curing mold.

FIG. 7 is a sectional view similar to FIG. 6, on an enlarged scale, during forming.

FIG. 8 is a fragmentary sectional view showing the trimming of the ring.

Figure 1:
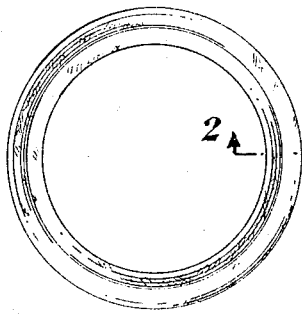
FIG. 1 is a plan view of the finished packing ring.
Figure 2:
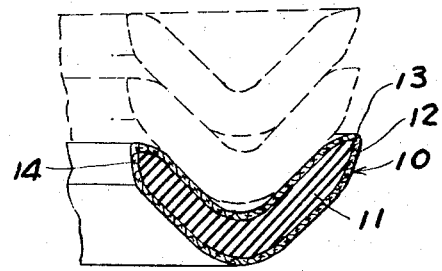
FIG. 2 is a sectional view on an elongated scale taken along the line 2—2 in FIGURE 1.

Referring to FIGS. 1 and 2, the packing ring 10 embodying the invention comprises a core 11 of cured elastomeric material and one or more layers 12 of braided fabric over the core, the interstices between the filaments of the fabric being filled with cured elastomeric material. As shown in FIGS. 1 and 2, the packing ring is V-shaped in cross section to define sealing lips 13, 14. Where a plurality of layers are provided, a coating or layer 15 of cured elastomeric material is present between the layers 12 of the fabric.

A packing of this type can be used singly (FIG. 2), or with superimposed packings of similar design for piston and cylinder applications and other similar packing applications to control and seal hydraulic fluid.

Figure 3:
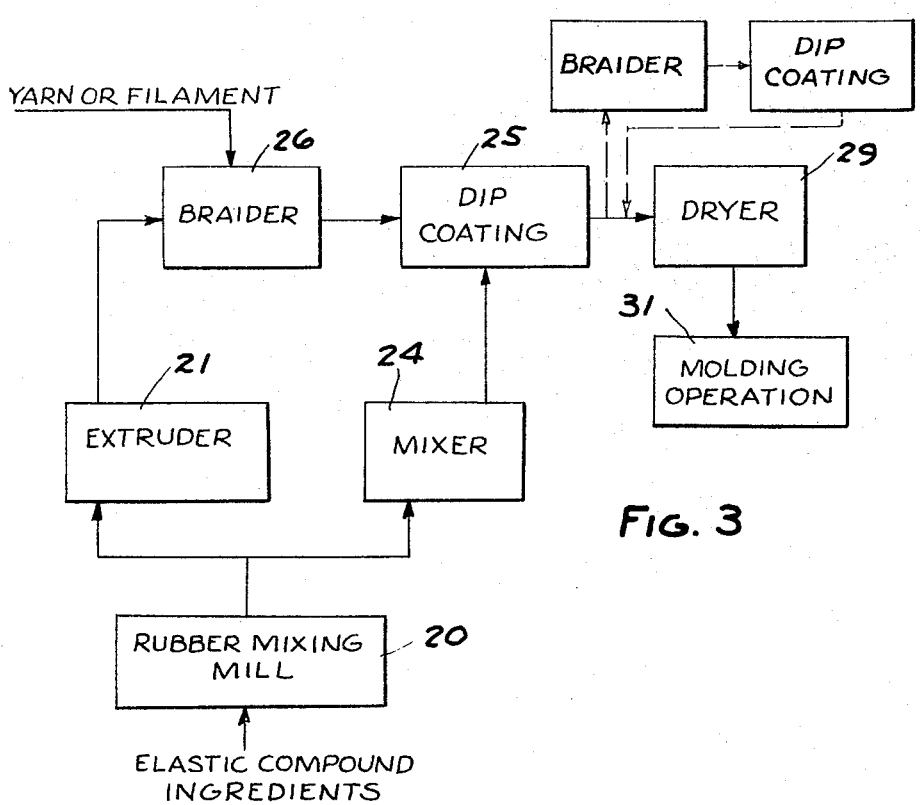
FIG. 3 is a black diagram showing the various steps of the method for preparing the material for molding and curing.
Figure 9:
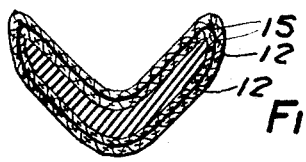
FIG. 9 is a sectional view similar to FIG. 2 showing a modified type of ring.

Referring to FIG. 3, which is a flow diagram showing the steps of the method of making the packing, as shown, the elastomeric material comprising the core 11 is mixed in a suitable device, such as a rubber mixing mill, and then a portion of this material is provided to an extruder 21 which extrudes a continuous length of uncured core 22 (FIG. 4). Another portion of the material is provided to a mixer 2 where the material is mixed with solvent to prepare a dip coating for dipping bath 25. The uncured extruded core 22 is then moved continuously through a braider 26 which braids a seamless layer 12 of fabric on the core. The braided core is then passed continuously through dipping bath 25 where a layer 28 of elastomeric material is deposited on the braided core (FIG. 4). Where a plurality of layers are required, the dipped and braided core is then passed through successive braiding and dipping applications, as represented by dotted lines in FIG. 3. When the desired number of layers of fabric have been braided on the core, it is passed through a drier 29 and can then be rolled up into rolls for use as desired to make the packings shown as described or other packings. Where large diameter packings are being formed, it may be desirable to dry the braided core after each dip coating in order to more readily remove the solvent.

Where it is desired to form the final packing, a predetermined length of the dipped and dried braided core 30 is cut from the roll and molded, represented by the molding station 31 in FIG. 3.

As shown in FIGS. 4 and 5, the ends of the length 30 are preferably cut at an angle 32 so that, when they are brought together, a preformed ring 33 is formed, as shown in FIG. 5. The ring is then placed in the cavity 34 of a mold 35 and the upper half 36 of the mold, having deforming section 37 is brought downwardly to shape the preformed ring 33 to the desired shape, as shown in FIG. 7. Simultaneously, heat is applied to the mold sections 35, 36 to cure the elastomeric material. Heat may be applied in any conventional manner as by heating the sections 35, 36 directly. The simultaneous application of heat and pressure not only cures the elastomeric material but, in addition, tends to cause the elastomeric material to more completely fill the interstices between the filaments of the fabric. Any excess material that may have been extruded radially inwardly or outwardly can then be trimmed in a trimming die, as shown in FIG. 8. The die comprises an inner member 38 that holds the packing ring against a holding die 39 and a double walled trimming die 40 that is moved downwardly against the inner and outer faces of the holding die 39 to trim the inner and outer edges of the lips of the packing.

Typical materials which can be used are:

| Material | Solvent | Curing Temp., °F. |
| --- | --- | --- |
| Neoprene | Toluol ethylene dichloride | 310 to 350 |
| Butadiene acrylonitrile | do | 310 to 375 |
| Butyl rubber | Toluol petroleum naphtha | 300 to 350 |

It can thus be seen that the resultant packing has symmetry and uniformity of fabric distribution. Weak spots are substantially eliminated. Since the fabric is uniformly distributed, increased resistance to rupture is obtained. The packing is neater and more uniform. By utilizing the described method, the characteristics of the packing can be controlled and varied easily. A great variety of packings can be obtained by changing the fabric and the type and composition of the elastomeric materials. There is substantially no waste and short runs are possible.

What we claim is:

1. A packing comprising a ring having a predetermined molded cross section, said ring comprising a core of cured elastomeric material, and a seamless tubular layer of braided fabric having a covering of substantially the same cured elastomeric material thereon surrounding said core, at least some of said cured elastomeric material penetrating the interstices of said braided fabric, said elastomeric material covering said fabric and said elastomeric material penetrating said interstices being cured in situ at the same time as curing of said core.

2. The method of making a packing which comprises extruding an uncured elastomeric material in the form of a core of indefinite length,
   braiding a seamless tubular layer of fabric over said uncured core,
   dipping said core with said braided layer of fabric in a coating comprising a solution of elastomeric material and a solvent,
   drying the dipped fabric and core,
   cutting off a predetermined length of said dipped dried fabric and core,
   shaping said predetermined length into a ring by bringing the ends of said length adjacent one another,
   and compressing and curing said ring into a predetermined cross section to form the packing.

3. The method of making a packing which comprises braiding a seamless tubular layer of fabric over a core of uncured elastomeric material,
   dipping said core with said braided layer of fabric in a coating comprising a solution of elastomeric material and a solvent,
   drying the dipped fabric and core,
   cutting off a predetermined length of said dipped dried fabric and core,
   shaping said predetermined length into a ring by bringing the ends of said length adjacent one another,
   and compressing and curing said ring into a predetermined cross section to form the packing.

4. The method of making a packing which comprises extruding an uncured elastomeric composition in the form of a core of indefinite length,
   braiding successive seamless tubular layers of fabric over said core,
   dipping said core with said braided layer of fabric between successive braiding steps in a coating comprising a solution of elastomeric material and a solvent,
   drying the dipped fabric and core after the last layer is braided,
   cutting off a predetermined length of said dipped dried fabric and core,
   shaping said predetermined length into a ring by bringing the ends of said length adjacent one another,
   and compressing and curing said ring into a predetermined cross section to form the packing.

5. The method of making a packing which comprises braiding successive seamless tubular layers of fabric over a core of uncured elastomeric material,
   dipping said uncured core with said braided layer of fabric in a coating comprising a solution of elastomeric material and a solvent,
   drying the dipped fabric and core after the last layer is braided,
   cutting off a predetermined length of said dipped dried fabric and core,
   shaping said predetermined length into a ring by bringing the ends of said length adjacent one another,
   and compressing and curing said ring into a predetermined cross section to form the packing.

References Cited by the Examiner

UNITED STATES PATENTS

| | | | |
| --- | --- | --- | --- |
| 183,252 | 10/1876 | Colvin | 277—288 X |
| 665,979 | 1/1901 | Restein | 277—228 X |
| 834,074 | 10/1906 | Patterson | 138—124 |
| 868,136 | 10/1907 | Shields | 277—228 X |
| 989,177 | 4/1911 | Montgomery | 277—228 X |
| 1,168,807 | 1/1916 | Hill | 154—46 |
| 1,388,428 | 8/1921 | Hessing | 156—393 |
| 1,469,519 | 10/1923 | Lister | 138—124 |
| 2,717,025 | 9/1955 | Jelinek | 277—228 X |
| 2,974,713 | 3/1961 | Hydrick | 156—393 |
| 3,013,830 | 12/1961 | Milligan | 277—230 X |
| 3,120,960 | 2/1964 | Pippert et al. | 277—125 |

LAVERNE D. GEIGER, *Primary Examiner.*

EARL M. BERGERT, *Examiner.*

L. PIRKEY, J. MEDNICK, *Assistant Examiners.*